Patented July 25, 1944

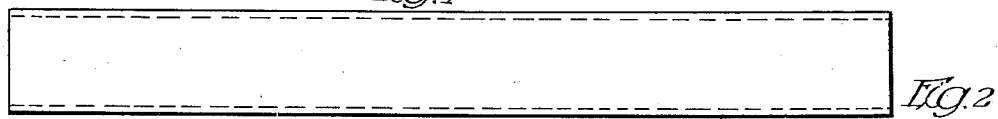
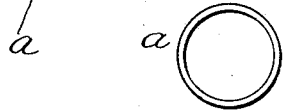
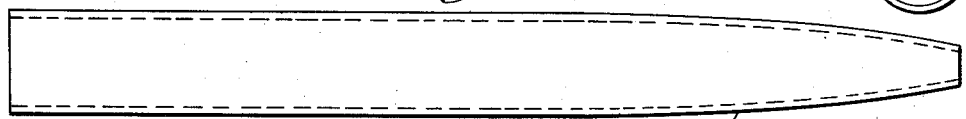
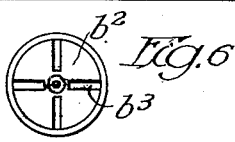
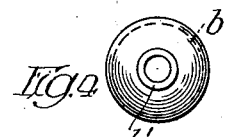
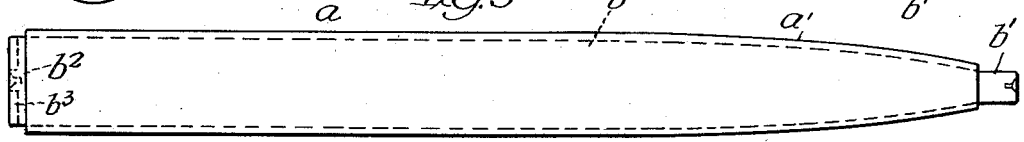
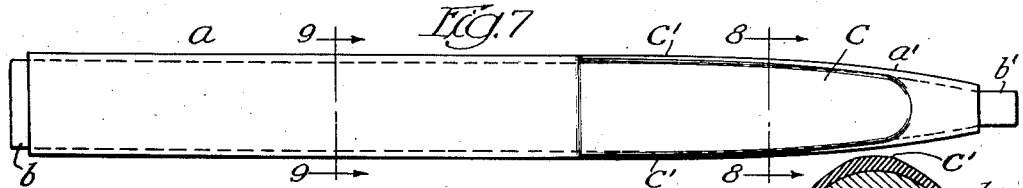
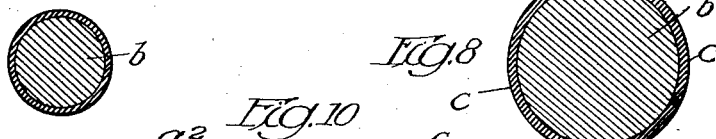
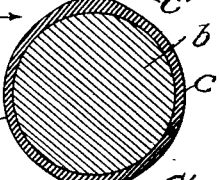
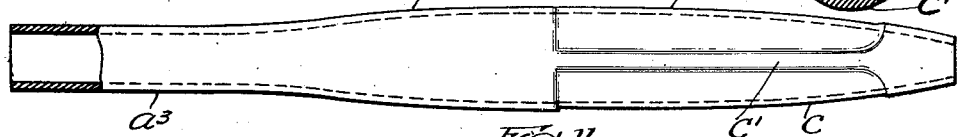
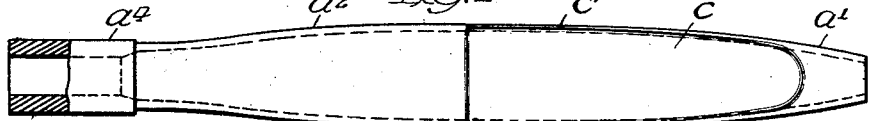
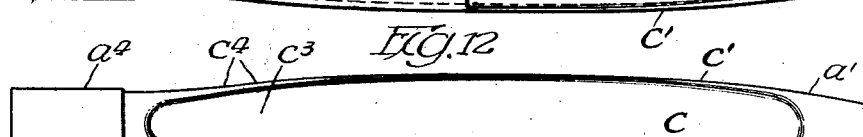
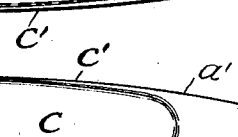

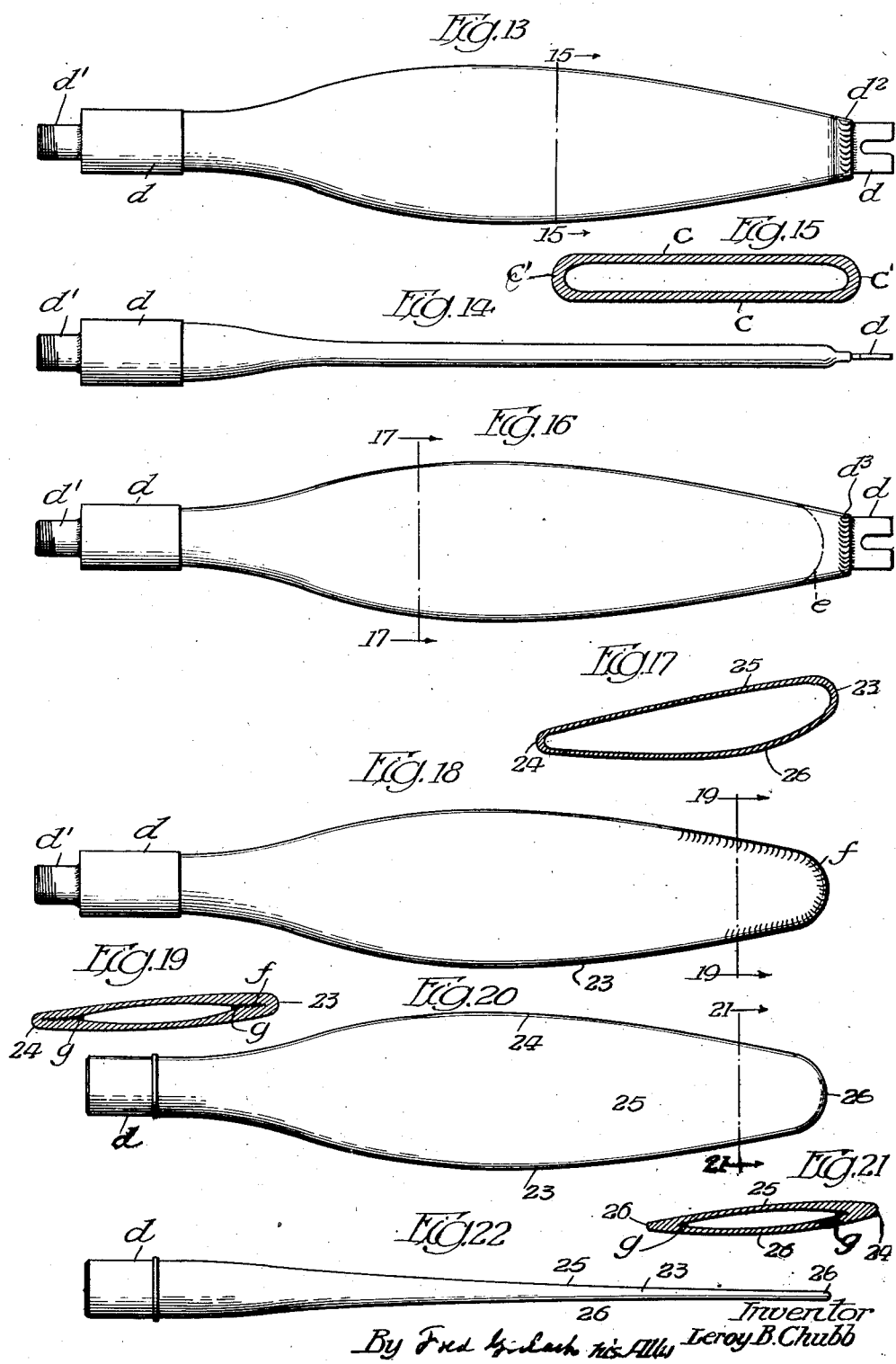

2,354,198

UNITED STATES PATENT OFFICE 2,354,198

MANUFACTURE OF PROPELLER BLADES

Leroy B. Chubb, Williamsport, Pa., assignor, by mesne assignments, to The Aviation Corporation, New York, N. Y., a corporation of Delaware Application July 12, 1941, Serial No. 402,085

3 Claims. (Cl. 29—156.8)

The invention relates to the manufacture of hollow steel propeller-blades.

One object of the invention is to provide a method of making a hollow steel propeller-blade with working faces and seamless leading and trailing edges of airfoil contour from a substantially straight tubular blank.

Another object of the invention is to provide a simple and economical method of making propeller-blades from substantially straight tubular blanks.

Other objects of the invention will appear from the detailed description.

In carrying out the several features of the invention, a straight section of steel tubing is first shaped to tubular portions which taper from approximately mid-length of the working faces of the blade desired toward their inner and outer ends, so that when the blank is flattened its width from said mid-length will be increased to form seamless longitudinally curved leading and trailing edges of airfoil profile to a point near the tip. Diametrically opposite zones of metal are cut away from the outer periphery of the blank to provide greater wall-thickness at the leading and trailing edges and reduced wall-thickness in the outer end-portions of the working faces of the blade after the blank has been tapered, as aforesaid, while the blank is shrunk on an arbor. Continuations of said zones are cut away to provide varying wall-thickness in the inner end-portions of the working faces of the blade after the inner end-portion has been shaped or swaged to tapered form and a portion of the inner end of the blank is reduced in diameter for forming a shank with an increased wall-thickness. This method reduces the necessary welded area to the tip-portion of the blade.

The invention consists in the several novel features which are hereinafter set forth and more particularly defined by claims at the conclusion hereof.

In the drawings: Fig. 1 is a side elevation of a straight tubular blank from which the propeller-blade is made. Fig. 2 is an end view of said blank. Fig. 3 is a plan illustrating the blank after one portion of the blank has been shaped to form a longitudinally tapered tubular portion to be used in forming the blade from approximately mid-length of the working faces to its outer end. Fig. 4 is an end view of the tapered blank shown in Fig. 3. Fig. 5 is a plan illustrating the blank shrunk on an arbor preparatory to cutting away diametrically opposite zones from the outer periphery of the previously tapered portion of the blank. Fig. 6 is a view of one end of the blank on the arbor. Fig. 7 is a view of the assembled arbor and blank with the zones of metal cut away from the outer periphery of the previously tapered outer end-portion of the blank to provide reduced wall-thickness in the working faces and greater wall-thickness at the leading and trailing edges. Fig. 8 is a section taken on line 8—8 of Fig. 7 on a larger scale. Fig. 9 is a section taken on line 9—9 of Fig. 7. Fig. 10 is a plan illustrating the blank after it has been shaped to provide a longitudinally tapered tubular portion which is used in forming the working faces from approximately mid-length of the blade to the shank and to provide a portion of smaller diameter which is adapted to be swaged into a shank. Fig. 11 is a plan illustrating the blank after the shank and with an increased wall-thickness has been formed on the inner end of the blank. Fig. 12 is a plan illustrating the blank after the zones of metal have been cut from the outer periphery of the last-tapered portion of the blank to provide varying wall-thickness in that portion of the blank. Fig. 13 is a plan illustrating the blank after both end-portions have been tapered and flattened, and a tip-locater and a nipple have been welded to the opposite ends of the blank preparatory to shaping the working faces to airfoil contour. Fig. 14 is a side view of the blank shown in Fig. 13. Fig. 15 is a section, on a somewhat larger scale, taken on line 15—15 of Fig. 13. Fig. 16 is a plan illustrating the blank after the airfoil working faces have been shaped. Fig. 17 is a section taken on line 17—17 of Fig. 16 on a somewhat larger scale. Fig. 18 is a plan of the blade after it has been welded at the tip. Fig. 19 is a section on a larger scale taken on line 19—19 of Fig. 18. Fig. 20 is a plan of the finished blade. Fig. 21 is a section on a larger scale taken on line 21—21 of Fig. 20. Fig. 22 is a side view of the finished blade.

The invention is exemplified in a method of producing propeller-blades from a substantially straight tubular blank or section of steel tubing $a$, such as is illustrated in Figs. 1 and 2.

The blank is first swaged or rolled by any well-known process into a taper $a'$ on that portion of the blank which is to be used in making the working portion of the blade approximately from mid-length to the outer end of the tip, as exemplified in Figs. 3 and 4. This taper is formed on a suitable curve for subsequent formation into the desired edge-profile from mid-length of the working faces to their outer ends.

Next, the blank with the tapered portion $a'$ is heated and shrunk onto an arbor $b$, as exemplified in Fig. 5. The arbor is cylindrical and tapered conformably to the inner periphery desired in the tubular blank so that any inherent irregularities in the inner periphery of the blank will be transferred to the outer periphery, and so that the blank will be accurately indexed for cutting away portions of its outer periphery in a lathe. The arbor $b$ has projecting ends $b'$ and $b^2$ for accurately centering the arbor and blank in a suitable lathe. The end $b^2$ is provided with grooves $b^3$ which are engaged by the lathe-chuck for rotating the blank and arbor for accurately cutting away desired portions of the metal from the outer periphery of the blank.

Next, the assembled arbor and blank are placed in a lathe with a suitable cam-controlled tool. Diametrically opposite zones $c$ which, after the blank has been flattened as hereinafter described, will be approximately of the contour of the working faces of the blade, are cut from the outer periphery of the blank in the tapered portion $a'$ of the blade, as exemplified in Fig. 7 and 8. Diametrically opposite longitudinally extending zones $c'$ of substantially full wall-thickness are left between the zones $c$ to leave greater wall-thickness for the leading and trailing edges to be formed. The cutting tool of the lathe is controlled by a suitable cam which determines the depth and area of the cuts to provide the desired variation in wall-thickness. After being cut as aforesaid the blank is heated sufficiently to permit its removal from the arbor and the latter is withdrawn therefrom.

Next, the tubular portion of the blank is swaged to form a taper $a^2$ extending from the greater diameter of taper $a'$ to the shank-end of the blank, as exemplified in Fig. 10. This tapered portion $a^2$ is used in forming the working portion of the blade from mid-length to the shank. The inner end of the blank beyond the taper $a^2$ is also swaged to a cylindrical tubular portion $a^3$ of reduced diameter, as exemplified in Fig. 10.

Next, the portion $a^3$ of reduced diameter is upset to form a shank $a^4$ having the desired greater wall-thickness necessary in the shank, as exemplified in Fig. 11.

Next, the blank with the shank formed thereon is placed in a lathe and diametrically opposite zones $c^3$, approximately of the contour of the working faces from mid-length to the shank, are cut away to reduce the wall-thickness in the working faces from approximately mid-length to a point adjacent the shank. Longitudinally extending zones $c^4$ are left to provide greater wall-thickness in the folds of the blank which are used in forming the inwardly tapered trailing and leading edges of the blade, as exemplified in Fig. 12. The cross-sectional shape of the tapered portion $a^2$ will then be similar to that shown in Fig. 8. Zones $c^3$ meet and are continuations of the zones $c$ and zones $c^4$ are continuations of the zones $c'$, so that when the blank is shaped as hereinafter described the joined zones $c$ and $c^3$ will conform approximately to, and be disposed in, the working faces and zones $c'$ and $c^4$ will be disposed in the leading and trailing edges. At this stage, the blank will be tubular and bulged between the shank and the tip, as exemplified in Fig. 12.

Next, a nipple $d'$ is welded to the shank-end of the blank, the tip-end is flattened, as at $d^2$, and a tip-locater $d$ is welded into the flattened tip-end, as exemplified in Fig. 13. The tapered portions of the blank are next placed in a press, without being heated, and flattened by suitable dies to the cross-sectional shape exemplified in Fig. 15 and the profile shown in Figs. 13 and 14. During this flattening the blank is subjected to hydraulic internal pressure supplied through nipple $d'$. The die-faces are flat so that the merging portions between the zones of different wall-thickness will become smooth between the flat portions and curves at the folds, and the unevenness produced by the variations in wall-thickness will be transferred from the outer face to the inner face, as exemplified in Fig. 15. This flattening with internal pressure is accomplished without heating the blade. The blank is positioned between the dies so that the longitudinally extending zones $c^4$ of greater wall-thickness will be in the folds between the flat faces and the cutaway zones $c$, $c^3$ will be flat to the curves at the folds. This flattening of the tubular blank having tapered portions as described results in increasing the bulge at mid-length relatively to the longitudinal taper or curvature in the tubular blank and produces substantially the desired airfoil profile of the leading and trailing edges. This increase of longitudinal curvature of taper during flattening also preliminarily shapes the blank for the subsequent formation of seamless welding and trailing edges, as hereinafter described. The flattened blank is next heated in a furnace and then placed in a press having dies with cavities conforming to the suction and pressure faces and leading and trailing edges of the desired airfoil contour. A suitable non-oxidizing reducing gas of approximately 600 pounds per square inch pressure, is delivered through nipple $d'$ into the chamber in the blade. This internal pressure expands the blank to conform to the die-cavity and into the shape exemplified in Fig. 16 and the cross-sectional shape shown in Fig. 17. The working faces and leading and trailing edges will then be shaped to airfoil contour.

Next, the outer end of the blank is trimmed off, as at $e$, on a curve conforming to the tip-profile desired. The tip locater will then be severed from the blank. The margins of the blank around the cut $e$ are then welded together, as at $f$, to close the tip, as exemplified in Fig. 18. This weld may, if desired, be extended a short distance along the relatively thin outer end-portions of the seamless leading and trailing edges to insure a complete closure at the tip and to weld together some of the area of the inner surfaces of the blade-faces in the thin portion adjacent the tip, as exemplified in Figs. 18 and 19.

Next, the working portion of the blade is placed in dies of the correct airfoil contour and hardened while confined therein. While being hardened the blade is subjected to internal gas pressure which expedites hardening, tends to iron out irregularities, and hardens the blade with the irregularities removed.

Next, the shank is machined to the desired finished shape and the faces, edges and tip of the blade are polished. A copper fillet $g$ may be inserted into and melted around the inner corners of the blade, as exemplified in an application filed by Harris P. Moyer, March 10, 1941, Serial No. 382,483.

The finished blade will have a seamless finished longitudinally curved leading edge 23, a seamless longitudinally curved trailing edge 24, a suction face 25, a pressure face, and a curved tip 26, all of airfoil contour.

The invention exemplifies a method of producing hollow steel propeller-blades in which a substantially straight tubular blank is first tapered at its ends to produce a shape which, when flattened, will result in seamless edges at the folds of the desired profile. The invention also exemplifies a method of producing hollow steel propeller blades from tubular blanks in which it is only necessary to weld the faces together at, and in proximity to, the tip. The invention also exemplifies a method of producing a hollow steel propeller blade from a substantially straight tubular blank of uniform wall-thickness in which the leading and trailing edges are seamless with working faces having a reduced wall-thickness and seamless edges of a greater wall-thickness. The invention also exemplifies a simple, efficient and economical method of producing hollow steel propeller-blades from a tubular blank.

The invention is not to be understood as restricted to the details set forth, since these may be modified within the scope of the appended claims, without departing from the spirit and scope of the invention.

Having thus described the invention, what I claim as new and desire to secure by Letters Patent is:

1. That improvement in the manufacture of hollow steel propeller-blades from substantially straight tubular blanks which comprises longitudinally tapering, by shaping, one end-portion of the blank, cutting away diametrically opposite zones from the outer periphery of the tapered portion to reduced wall-thickness for the working faces and leaving longitudinally extending zones of greater thickness for the leading and trailing edges, longitudinally tapering, by shaping, an adjacent portion of the blank away from the other tapered portion, thereafter cutting away diametrically opposite zones from the outer periphery of the second tapered portion to reduce the wall-thickness for the working faces and leaving longitudinally extending zones of greater thickness for the leading and trailing edges, and shaping the oppositely tapered tubular portions into working faces of airfoil cross-section with the zones of reduced wall-thickness in said faces and the zones of greater thickness into longitudinally curved seamless leading and trailing edges extending substantially to the tip of the blade.

2. That improvement in the manufacture of hollow steel propeller-blades from substantially straight tubular blanks which comprises longitudinally tapering, by shaping, one end-portion of the blank, cutting away diametrically opposite zones from the outer periphery of the tapered portion to reduced wall-thickness for the working faces and leaving longitudinally extending zones of greater thickness for the leading and trailing edges, longitudinally tapering, by shaping, an adjacent portion of the blank away from the other tapered portion and forming a tubular portion of reduced diameter at the outer end of the second tapered portion, swaging the portion of reduced diameter for a shank with increased wall-thickness, thereafter cutting away diametrically opposite zones from the outer periphery of the second tapered portion between the shank portion and the first tapered portion to reduce the wall-thickness for the working faces and leaving longitudinally extending zones of greater thickness for the leading and trailing edges, and shaping the oppositely tapered tubular portions into airfoil working faces with the zones of reduced wall-thickness in said faces and the zones of greater thickness into longitudinally curved seamless leading and trailing edges extending substantially to the tip of the blade.

3. That improvement in the manufacture of hollow steel propeller-blades from substantially straight tubular blanks which comprises longitudinally tapering, by shaping, one end-portion of the blank, cutting away diametrically opposite zones from the outer periphery of the tapered portion to reduced wall-thickness for the working faces and leaving longitudinally extending zones of greater thickness for the leading and trailing edges, thereafter longitudinally tapering, by shaping, an adjacent portion of the blank away from the other tapered portion, then cutting away diametrically opposite zones joined to the cut-away zones in the tapered portion from the outer periphery of the second tapered portion to reduce the wall-thickness for the working faces and leaving longitudinally extending zones of greater thickness for the leading and trailing edges, flattening the tapered portions of the blank while tubular with semi-circular folds across the zones of greater thickness, shaping the flattened portion and folds into airfoil working faces with the zones of reduced wall-thickness in said faces and the zones of greater thickness into longitudinally curved seamless leading and trailing edges extending substantially to the tip of the blade, trimming one end of the blank to tip-profile, and welding the faces together between the seamless edges to form the tip.

LEROY B. CHUBB.